US006219107B1

(12) United States Patent
Renner et al.

(10) Patent No.: US 6,219,107 B1
(45) Date of Patent: Apr. 17, 2001

(54) AUTOMATIC AGC BIAS VOLTAGE CALIBRATION IN A VIDEO DECODER

(75) Inventors: Karl H. Renner, Dallas; Apparajan Ganesan, Austin, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/139,038

(22) Filed: Aug. 24, 1998

Related U.S. Application Data

(60) Provisional application No. 60/077,389, filed on Mar. 10, 1998, and provisional application No. 60/068,420, filed on Dec. 22, 1997.

(51) Int. Cl.[7] .................................................. H04N 5/52
(52) U.S. Cl. ........................... 348/678; 348/689; 348/572
(58) Field of Search .................................. 348/678, 679, 348/682, 685, 689, 697, 572; H04N 5/52

(56) References Cited

U.S. PATENT DOCUMENTS

| | | | |
|---|---|---|---|
| 4,628,362 | * 12/1986 | Waehner | 348/572 |
| 4,963,969 | * 10/1990 | Kitaura | 348/572 |
| 5,379,075 | * 1/1995 | Nagasawa | 348/678 |

OTHER PUBLICATIONS

Mangelsdorf et al., "A CMOS Front–End for CCD Cameras," 1996 IEEE International Solid–State Circuits Conference, Session 11, Electronics Imaging Circuits, Paper FA 11.5, pp. 186–187, 441.

Alrutz et al., "A Single Chip Video Front End Decoder," IEEE Transactions on Consumer Electronics, vol. 39, No. 3, Aug. 1993, pp. 489–495.

Redman–White et al., "An Analog CMOS Front–End for a D2–MAC TV Decoder," IEEE Journal of Solid–State Circuits, vol. 29, No. 8, Aug. 1994, pp. 998–1001.

M. Haas, "Advanced Two IC Chipset for DVB on Satellite Reception," IEEE Transactions on Consumer Electronics, vol. 42, No. 3, Aug. 1996, pp. 341–345.

J.J. Rijns, "CMOS Low–Distortion High–Frequency Variable–Gain Amplifier," IEEE Journal of Solid–State Circuits, vol. 31, No. 7, Jul. 1996, pp. 1029–1034.

Siniscalchi et al, "High–Precision, Programmable 1–10MHz Bandwidth, 0–20dB Gain Communication Channel for Digital Video Applications," IEEE 1996 Custom Inegrated Circuits Conference, pp. 85–88.

* cited by examiner

Primary Examiner—Sherrie Hsia
(74) Attorney, Agent, or Firm—Wade James Brady, III; Frederick J. Telecky, Jr.

(57) ABSTRACT

A video decoder circuit is provided with automatic AGC bias voltage calibration. The video decoder circuit has an input for receiving a video signal that is capacitively coupled to an analog front-end circuit. The decoder circuit includes a microprocessor-based control circuit coupled to the analog front-end circuit. The control circuit includes a bias circuit, a gain interface circuit for changing the amplitude of the video signal prior to filtering in a filter circuit, an offset circuit for changing the DC-level shift of the video signal, and a switching circuit for switching into a calibration mode by bypassing the filter circuit and connecting the gain interface circuit directly to an analog-to-digital conversion circuit of the analog front-end circuit.

28 Claims, 5 Drawing Sheets

AUTOMATIC AGC BIAS VOLTAGE CALIBRATION IN A VIDEO DECODER

CROSS-REFERENCE TO RELATED APPLICATION

This application claims priority from a provisional application Ser. No. 60/077,389, filed Mar. 10, 1998, and also from provisional application Ser. No. 60/068,420, filed Dec. 22, 1997, which are hereby incorporated by reference. However, the content of the present application is not identical to that of the priority applications.

BACKGROUND AND SUMMARY OF THE INVENTION

The present invention relates to control methods for automatic gain control circuits in video decoders.

Background: Composite Video

The satisfactory reproduction of a picture requires the transmission of several types of information combined into a single waveform called a composite video signal. The signal is composed of video information and synchronizing information. Composite video describes a signal in which luminance, chrominance, and synchronization information are multiplexed in the frequency, time, and amplitude domain for a single-wire distribution. The luminance is defined as the component signal in color video systems that represents the brightness of the image. Chrominance is defined as the component signal in color video systems that describe color-difference information.

The video signal conveys information concerning the blanking level, the black reference level, average scene brightness level, picture details, and color values. The video signal is unipolar with one direct current ("DC") level (nominally 0 volts) representing black, and a second level (nominally +700 mV) representing white. Any level between 0 and 700 mV represents a degree of gray.

The synchronizing information consists of horizontal and vertical scanning synchronization, and chrominance decoder synchronization. The horizontal and vertical synchronization information is used to trigger the horizontal and vertical deflection circuits in the receiver. The horizontal sync tells the display where to put the video signal in the left-right dimension, and the vertical sync tells the display where to put the signal in the top-bottom dimension. It consists of pulses having a specific amplitude, duration, and shape best suited to the task at hand. The synchronizing pulses are unipolar with a reference level of 0 V and a peak negative level of nominally −300 mV.

The video signal waveform, with a nominal peak-to-peak amplitude of 700 mV, and the synchronizing signal waveform, with a nominal peak-to-peak amplitude of 300 mV, are added together to form a composite video signal of 1 V peak-to-peak. The synchronizing pulses are placed in parts of the composite signal that do not contain active picture information. These parts are blanked (forced below a black level) to render invisible the retrace of scanning beams on a correctly adjusted display.

These standard video signal levels apply to both conventional television scanning standards—National Television System Committee ("NTSC") and Phase Alternating Line ("PAL"). The U.S standard is NTSC which uses 525 lines at 60 Hz, while PAL is predominant in Europe and uses 625 lines at 50 Hz. Composite video signals are expressed in IRE units. An IRE unit is defined as one-hundredth of the excursion from the blanking level (0 IRE units) to the reference white level (100 IRE units). A standard 1 V peak-to-peak signal is said to have an amplitude of 140 IRE units of which 100 IRE units are luminance, and 40 IRE units are synchronization information. Further discussion of video circuits and signals can be found in the following texts: M. Robin, DIGITAL TELEVISION FUNDAMENTALS, McGraw-Hill (1998); K. Jack, VIDEO DEMYSTIFIED, 2nd Edition, Harris Semiconductor (1996); and A. Inglis, VIDEO ENGINEERING, 2nd Edition, McGraw-Hill (1996), all of which are hereby incorporated by reference.

Background: Video Decoders

When decoding composite video signals, the input analog video signal is DC-restored to ground during the horizontal sync time, setting the "sync tip" to a zero value. The sync tip is that part of the sync signal (most negative level) which is used as a reference point when handling the video signal (see FIG. 2). Automatic gain control ("AGC") is used to keep the output signal of the circuit constant as the input video signal amplitude varies. When a single-ended input (the signal swings relative to a ground) is converted to a differential signal, an internal voltage bias is required. (The differential mode of operation has the advantage of rejection of common-mode signals such as power supply noise and other interferences.) The differential input signal swings about an internal voltage bias which is equal to approximately one-half the input signal peak-to-peak amplitude. The bias voltage must vary as the input amplitude varies. Error in the bias voltage contributes to error in the offset of the AGC output which translates into an undesirable sync tip level. When the signal is amplified by the AGC circuit, a calibration phase for the AGC is employed to compensate for bias voltage errors affecting the output of the analog-to-digital ("A2D") converter.

Automatic AGC Bias Voltage Calibration in Video Decoder

The present application discloses a method for automatic calibration of AGC bias voltage in a differential video decoder by intermittently applying the unfiltered differential signal directly to the A2D to obtain calibration values. A calibration sequence is performed when a loss of lock to horizontal sync occurs or when perhaps a channel has been changed. A microprocessor connected to the video decoder circuit determines the gain and offset based upon pixel samples obtained from the sync tip and "back porch," and feeds back the adjusted values to the analog circuit. (The back porch, labelled by "C" in FIG. 2, defines another reference level, and is that level from the sync pulse to the start of the active video information.) During calibration, the AGC outputs are linked directly to the A2D inputs. After the calibration process, the A2D input is switched back to receive the filtered differential signal. The gain and bias voltages are then adjusted to compensate for the gain and offset errors in the filters, and to achieve the desired sync tip height and back porch pixel levels at the A2D output.

An advantage is that the calibration feature is automatically controlled using a microprocessor. Another advantage is that performing calibration of bias voltage in the AGC circuit after acquisition of a lock to the horizontal sync, compensates for any error in the internal voltage reference and DAC output, resulting in yield enhancement.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The Composite Signal

Figure 2:
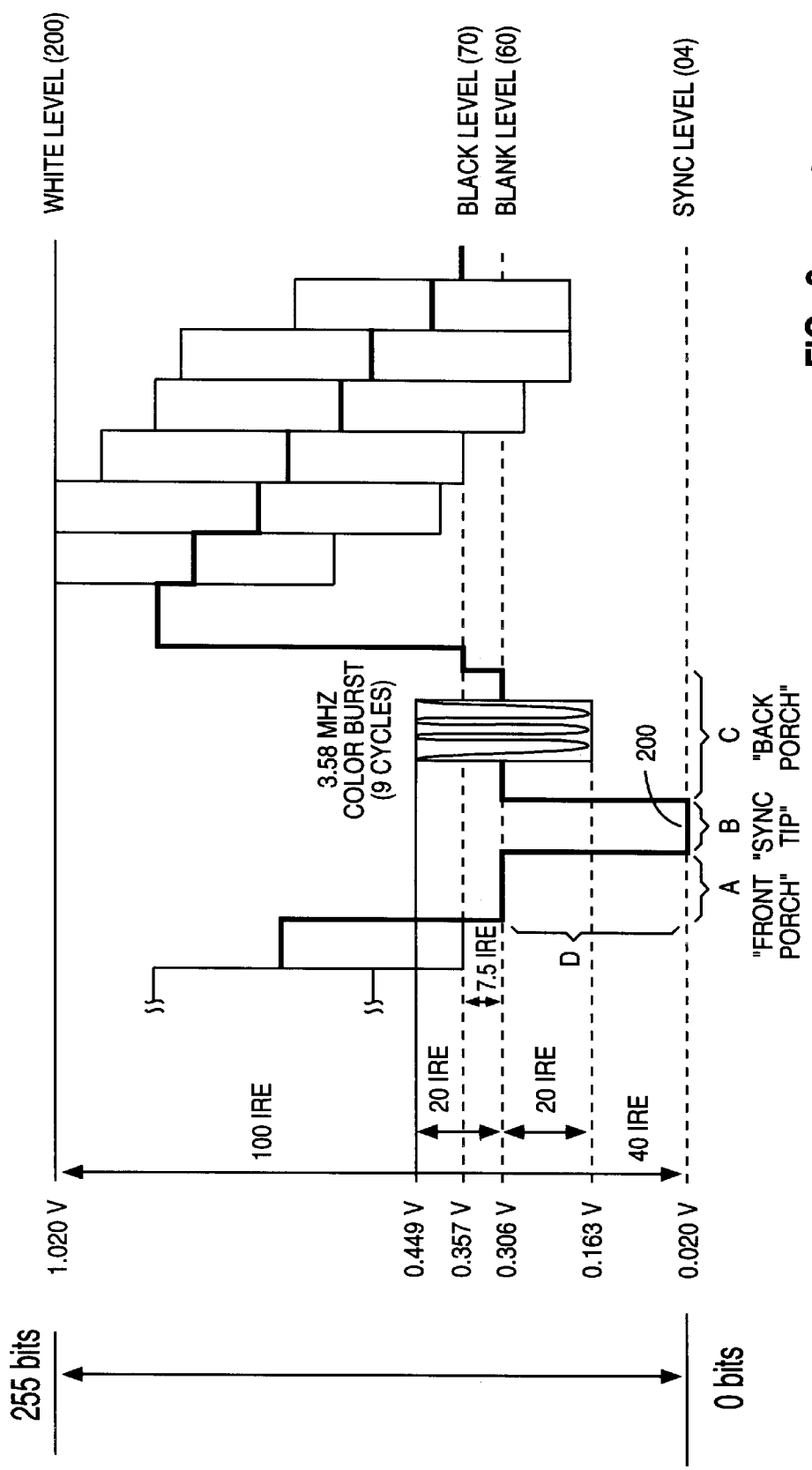
FIG. 2 shows a typical NTSC composite video signal with 8-bit voltage levels.

The analog front end of the video decoder performs automatic gain and offset control functions such that the output of the A2D converter has a constant amplitude as the composite video input varies over a range from −9 dB to +3 dB. FIG. 2 shows a typical NTSC composite video signal with 8-bit voltage levels. Section A is designated the "front porch" which just precedes the sync pulse (Section B). Section C is the called the "back porch" and just follows the sync pulse. The sync tip 200 of the input is clamped to a reference voltage and corresponds to an A2D output pixel near zero. (In the preferred embodiment, the clamped reference voltage approximates 1.5 to 1.6 volts.) The difference between the sync tip and the back porch level is called the sync height (Section D). The gain and offset are automatically adjusted such that the desired sync height and back porch level are reached.

Analog Front End

Figure 1:
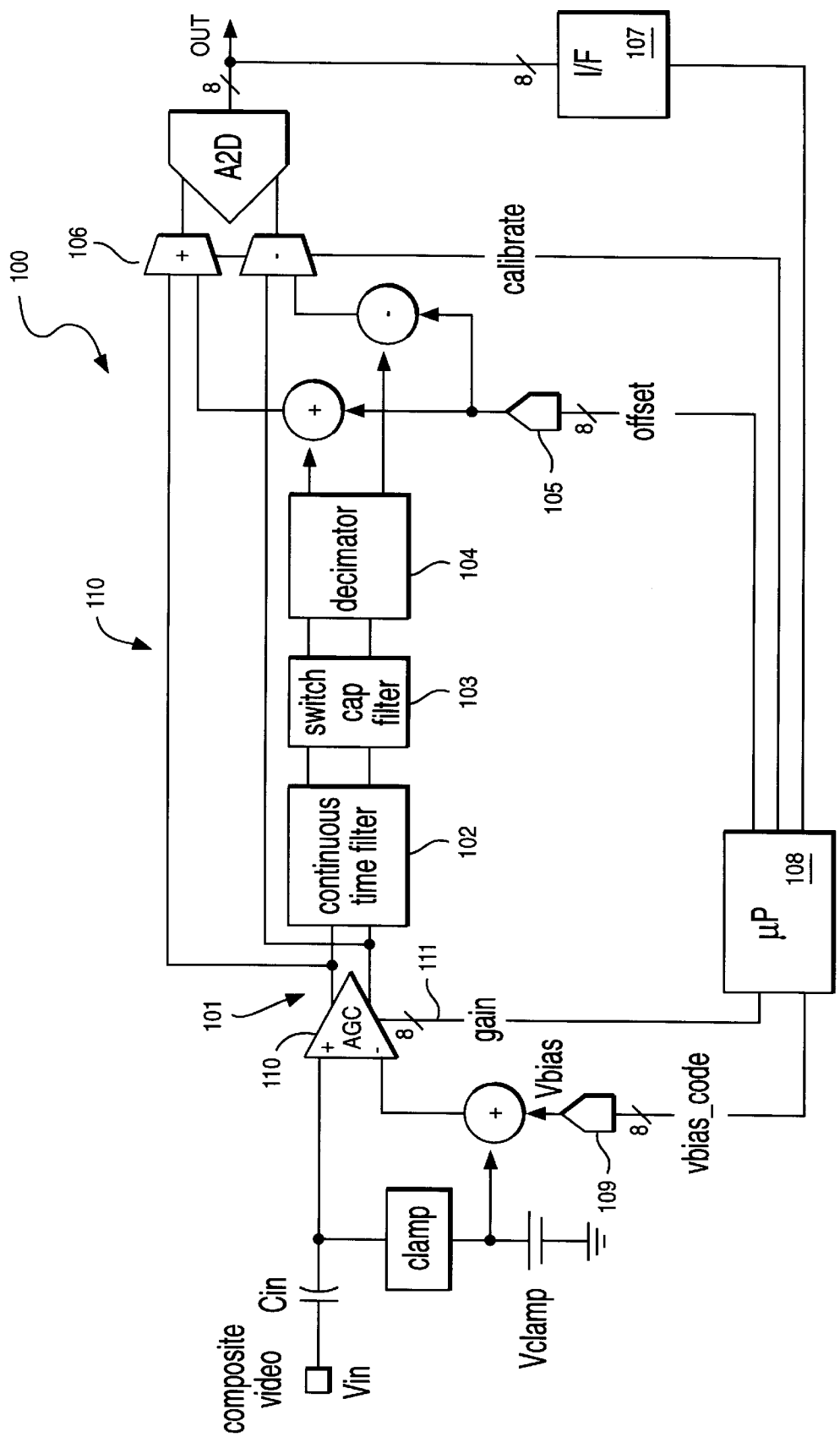
FIG. 1 shows the analog front end according to the preferred embodiment.

FIG. 1 illustrates the analog front end according to the preferred embodiment. In the preferred embodiment, the input signal may vary from approximately 35–130% of its nominal amplitude, and should be allowed to produce no more than a 1–2 IRE unit variation at the output. The single-ended composite video at the input $V_{in}$ is capacitively coupled through capacitor $C_{in}$ into the circuit 100 where the sync tip signal level is clamped to a reference voltage $V_{clamp}$. The AGC block 110 converts the input to a differential signal and amplifies it.

In normal mode, the output of the AGC 110 is filtered by a continuous-time filter 102 connected in cascade with a switched capacitor filter 103. The continuous-time and switched-capacitor filters attenuate frequencies above approximately one-half the A2D sampling frequency (e.g. a sampling frequency of 12.27 MHz for a square pixel rate, and 13.5 MHz for the 8-bit pixel1 coding standard) to avoid aliasing of these high frequencies into the video passband. The switched capacitor filter 103 output is then input to a decimator 104, which down-samples the output of the switched capacitor filter 103 (which is clocked by six times the sampling frequency). Then a DC-offset voltage 105 is applied to the decimator 104 output, to provide the input to the A2D. The microprocessor 108 in the video decoder determines the vbias_code gain and offset based upon pixel samples obtained from the sync tip and back porch signal levels. The input signals to the AGC are written as $$V_{in+}=V_{clamp}+V_{in}$$

$$V_{in-}=V_{clamp}+V_{bias}$$

The AGC outputs are written below, where $V_{cmode}$ is the common-mode voltage at the AGC output.

$$V_{out+}=V_{cmode}+G*(V_{in+}-V_{in-})$$

$$V_{out+}=V_{cmode}+G*(V_{in}-V_{bias})$$

$$V_{out-}=V_{cmode}-G*(V_{in+}-V_{in-})$$

$$V_{out-}=V_{cmode}-G*(V_{in}-V_{bias})$$

The differential output can then be written as $$V_{dif}=V_{out+}-V_{out-}$$

$$V_{dif}=2*G*(V_{in}-V_{bias})$$

The offset voltage may then be added to generate the A2D differential input.

$$V_{A2D}=2*G*(V_{in}-V_{bias})+V_{offset}$$

The A2D differential input range, in the presently preferred embodiment, is from −1 volt to +1 volt which corresponds to a pixel range of 0 to 255 levels. During the calibration phase, the AGC outputs are connected directly to the A2D input.

Calibration is performed whenever loss of lock to horizontal sync occurs (e.g. change of channels). In calibration mode, a microprocessor 108 controls the calibration sequence of events. In a simplified drawing, the digital interface from the microprocessor 108 to the analog front-end circuit 100 is provided through the several inputs: digital-to-analog ("D2A") vbias_code input 109, gain control 111 of the AGC 110, D2A offset control input 105, and calibration switching control of differential line switches 106. The microprocessor 108 enables the switches 106 which connect the differential signal output of the AGC 110 (at node 101) directly to the A2D inputs. Gain and voltage bias $V_{bias}$ are adjusted to achieve the desired sync height and back porch pixel levels, based upon a sampling of the digital output signals fed back to the microprocessor 108 through an interface circuit 107. The microprocessor 108 runs the program until it converges on a bias voltage value. Typical values for gain and bias voltage are 64 bit levels, which corresponds to −1 volt and −0.5 volt, respectively. When the sync signal is present, the input $V_{in}$ is 0 volts. When the back porch is present, $V_{in}$ is at a back porch voltage $V_{bp}$. Based upon these two conditions, two equations can be written, and the gain G and bias voltage $V_{bias}$ can be solved for.

sync tip: $V_{in}=0$ $$V_{dif}=-1.0=2*G*(0-V_{bias})$$

back porch: $V_{in}=V_{bp}$ $$V_{dif}=-0.5=2*G*(V_{bp}-V_{bias})$$

Combining the equations yields the following solution for G and $V_{bias}$.

$$V_{bias}=1/(2*G)$$

$$G=1/(4*V_{bp})$$

If the input $V_{in}$ has a nominal 1 volt amplitude, then $V_{bp}=0.25$ volts, which corresponds to gain G=1, and bias voltage $V_{bias}=0.5$ volts. The bias voltage is approximately half of the input signal peak-to-peak amplitude. Therefore a program which adjusts G and $V_{bias}$ to achieve the desired sync tip height and back porch levels at the A2D output, will converge to a correct value for the bias voltage $V_{bias}$. When the program converges, a delta value is computed and stored based upon the difference between vbias_code and the gain G.

The A2D input is then switched to the output of the voltage offset block 105 (normal mode), and gain and offset are adjusted to compensate for gain and offset errors in the filters, and to achieve the desired pixel levels at the A2D output OUT. As the gain varies, the delta value is added to the gain code input 111 to produce the vbias_code.

TVP5010 Encoder Chip

Figure 4:
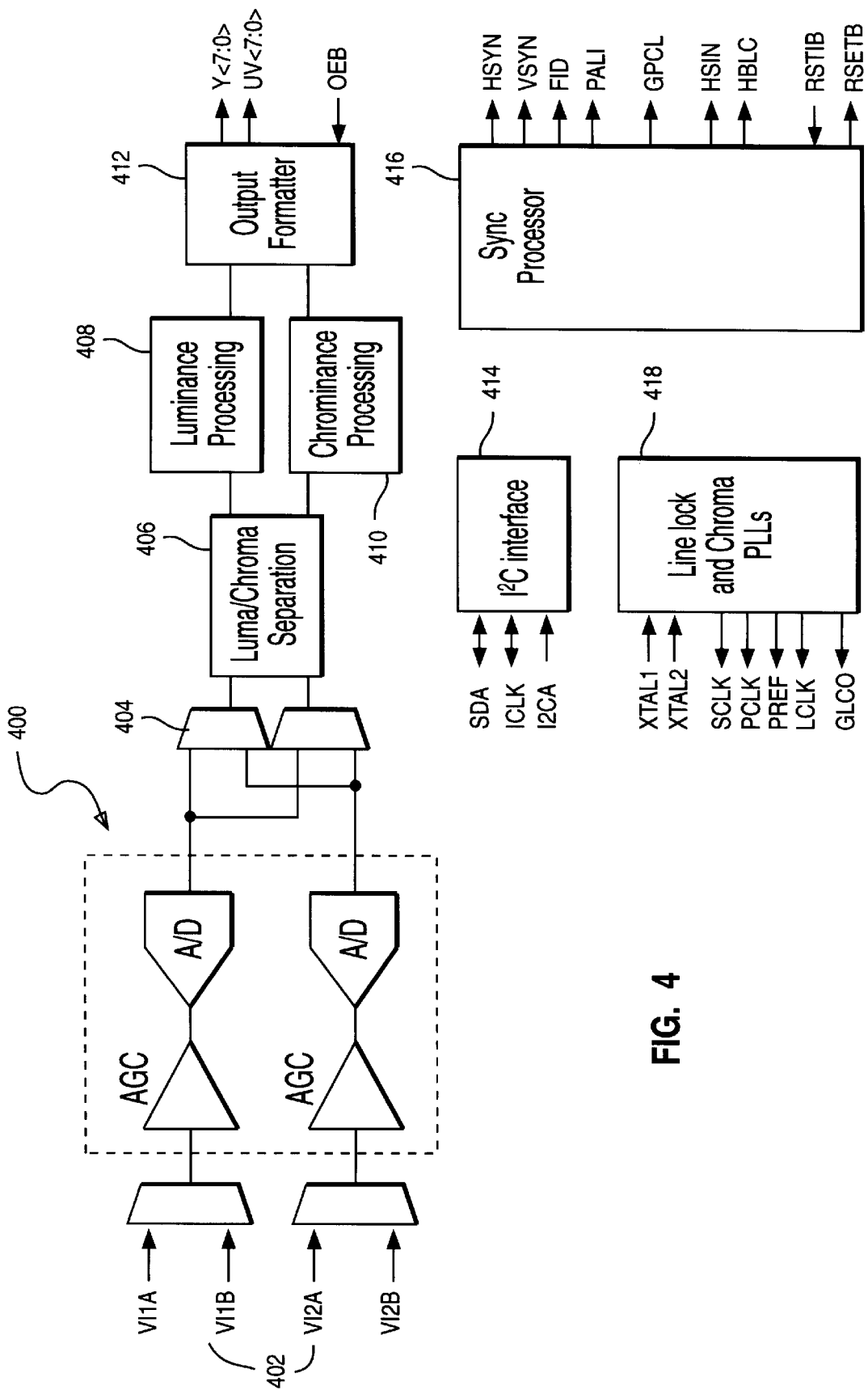
FIG. 4 shows a block diagram of a Texas Instruments TVP5010 chip incorporating the preferred embodiment.

FIG. 4 shows a block diagram of a Texas Instruments TVP5010 chip incorporating the preferred embodiment. The TVP5010 is a multistandard digital video decoder which converts baseband analog NTSC or PAL video signals into digital YUV video components. The YUV components are Y for the luma (or black and white) portion of the signal, and U-V are the chroma (color) difference components. The chip includes two inputs 402 so that composite video (single input) and S-video (both inputs) signals may be accommodated. The circuit portion 400 is described in greater detail in FIG. 1. A cross multiplexer 404 provides input to the Y/C separator 406. The separator 406 provides individual inputs to each of the luminance 408 and chrominance 410 processing circuits. The output formatter 412 receives the luminance and chrominance signals and programs the eight Y and U/Y digital outputs into various formats: for example, 16-bit or 8-bit 4:2:2, 12-bit 4:1:1, and ITU-R BT.656 parallel interface standard. Communication to and from the chip is through a standard I²C bus 414. Two signals, serial input/output data SDA line, and input/output clock line ICLK, carry information between the devices connected to the bus. The timing block 418 provides clocking for all chip functions. A sync processor 416 comprises both horizontal and vertical sync processors. The horizontal processor generates a horizontal sync pulse HSYN, a horizontal clamping pulse HBLC, and a horizontal sync tip indicator HSIN. The vertical sync processor initiates a vertical sync pulse VSYN, and an odd/even field indicator FID.

Board-Level Implementation

Figure 3:
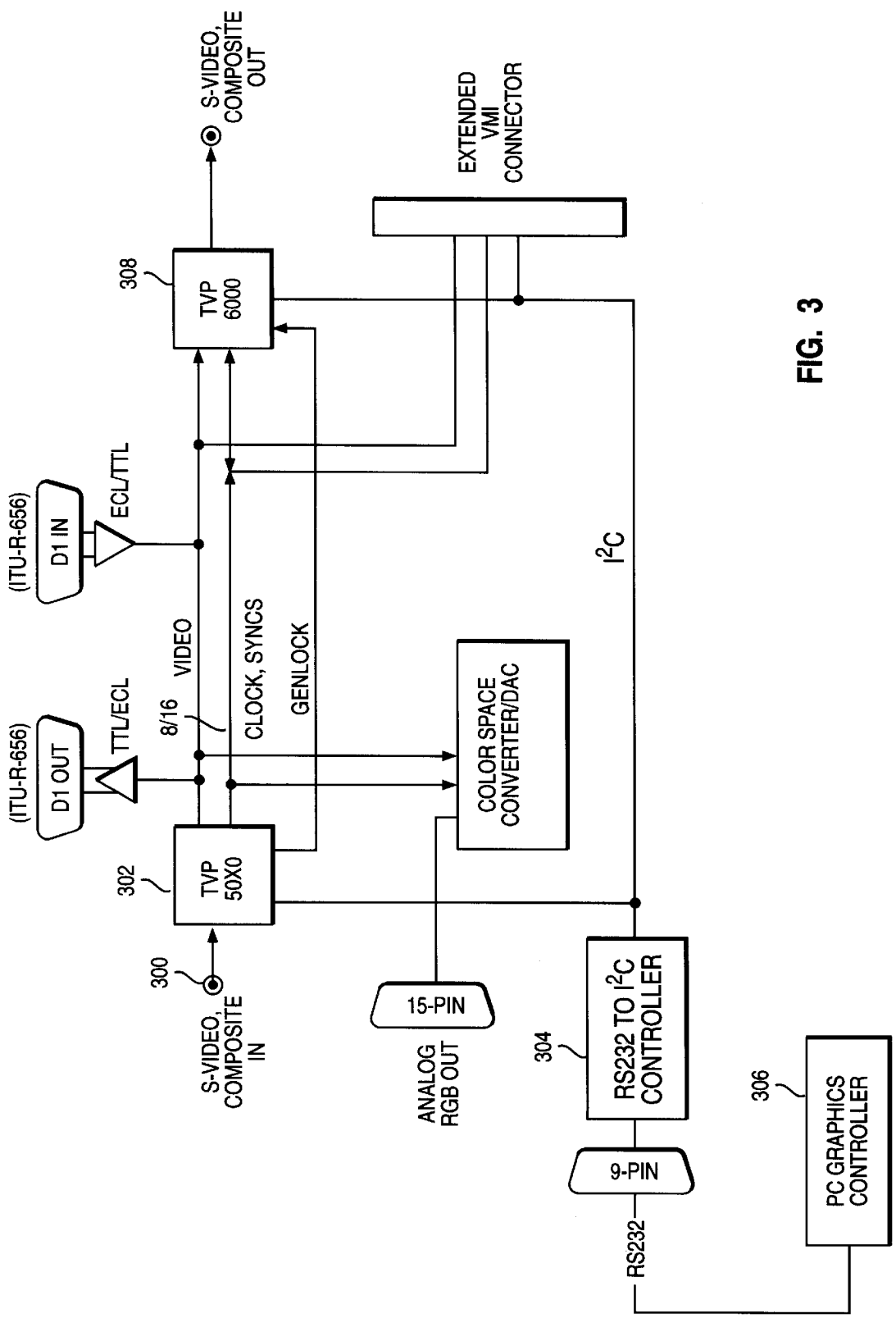
FIG. 3 shows a preferred embodiment which includes the front-end of FIG. 1.

A board-level implementation of the preferred embodiment in a TVP50x0 device by Texas Instruments, Inc., is shown in FIG. 3. The video signal is received at input 300 from an analog video source (e.g. VCR or camcorder). The circuit 302 converts the signal into the desired digital video format. An I²C communications interface 304 allows the graphics controller 306 to control the decoder circuit 302, and the output video circuit 308 (e.g. TVP6000). Other inputs and outputs are provided, as noted.

Applicant discloses another control technique in a copending U.S. patent application, Automatic Gain and Offset Control in a Video Decoder Analog Front End, U.S. patent application Ser. No. 09/216,213, which is hereby incorporated by reference.

Calibration Flowchart

Figure 5:
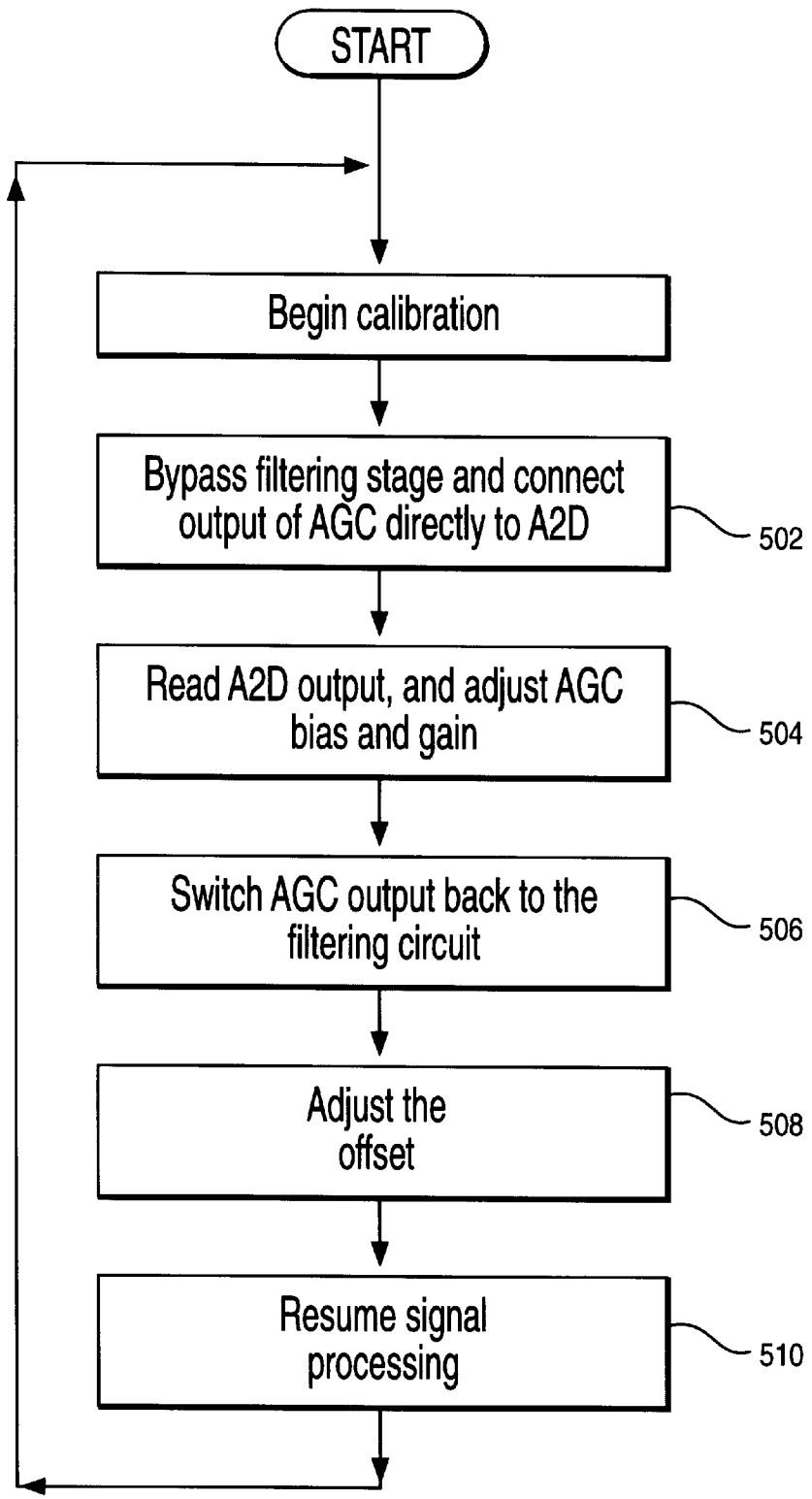
FIG. 5 shows a flowchart of the calibration process.

FIG. 5 shows a flowchart of the calibration process. The calibration process is performed whenever a loss of lock to horizontal sync occurs, or when a change of input signal occurs by, for example, a change of channel. The calibration process begins by connecting the output of the AGC directly to the A2D (Block 502). The output signal of the A2D is then sampled to obtain values for adjusting AGC bias and gain (Block 504), and eventually, offset. When the output signal of the A2D is at the desired level (according to the bias and gain adjustments), the AGC output is switched back to the filtering circuit (Block 506). At this point, the signal offset is adjusted prior to input to the A2D (Block 508). The normal decoding process of the video signal continues until an event triggers the calibration process to begin again (Block 510).

Alternative Embodiment: Single-Ended Circuit

According to a disclosed class of innovative embodiments, there is provided an alternative embodiment where a single-ended implementation may be used with the disclosed control methods.

According to a disclosed class of innovative embodiments, there is provided: a method for amplifying video signals, comprising the steps of: (a.) during normal operation, passing an analog video signal successively through at least one automatic-gain-control stage, at least one analog filter stage, and an analog-to-digital converter stage; and (b.) when calibration is required, then automatically (i.) bypassing at least one said filter stage, and feeding said analog video signal through said automatic-gain-control stage and said analog-to-digital converter stage, and adjusting said automatic-gain-control stage in accordance with the output of said converter stage; and thereafter (ii.) feeding said analog video signal through said automatic-gain-control stage, said at least one filter stage, and said analog-to-digital converter stage, and adjusting an offset value at the input of said converter stage in accordance with the output of said converter stage; whereby optimal calibration is achieved.

According to another disclosed class of innovative embodiments, there is provided: a method for controlling a video decoder circuit, comprising the steps of: (a.) receiving a first video signal at an input to an analog front-end circuit; (b.) converting said first signal into a differential signal using adjustment of gain and bias voltage values; (c.) in a first mode, inputting said second signal to a conversion circuit; (d.) reading the output of said conversion circuit to determine gain and/or bias values; and (e.) in a second mode, filtering said second signal with said at least one filter stage not used in said first mode, prior to input to said conversion circuit.

According to another disclosed class of innovative embodiments, there is provided: a video decoder circuit, comprising: an input for receiving a video signal, said input being capacitively coupled to an analog front-end circuit; and a microprocessor-based control circuit connected to said analog front-end circuit, and comprising; a bias circuit for providing a bias voltage; a gain interface circuit for changing the amplitude of said input video signal prior to filtering in a filter circuit; an offset circuit for changing the DC-level shift of said input video signal; and a switching circuit for switching into a calibration mode, by bypassing said filter circuit and connecting directly to an analog-to-digital conversion circuit of said analog front-end circuit.

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

It should also be noted that the disclosed innovative ideas are not limited only to NTSC circuits, but also to PAL, NTSC, SECAM, HDTV, and multi-standard circuits.

It should also be noted that the disclosed innovative ideas are not limited only to composite video circuits, but also to component video circuits.

What is claimed is:

1. A method for amplifying video signals, comprising the steps of:
   (a.) during normal operation, passing an analog video signal successively through at least one automatic-gain-control stage, at least one analog filter stage, and an analog-to-digital converter stage; and
   (b.) when calibration is required, then automatically
      (i.) bypassing at least one said filter stage, and feeding said analog video signal through said automatic-gain-control stage and said analog-to-digital converter stage, and adjusting said automatic-gain-control stage in accordance with the output of said converter stage; and thereafter
      (ii.) feeding said analog video signal through said automatic-gain-control stage, said at least one filter stage, and said analog-to-digital converter stage, and adjusting an offset value at the input of said converter stage in accordance with the output of said converter stage;
   whereby optimal calibration is achieved.

2. The method of claim 1, wherein said filter stage comprises a switched capacitor filter.

3. The method of claim 1, wherein said step (b.) is automatically initiated whenever horizontal synchronization is lost.

4. The method of claim 1, wherein, in said step (b.)(i.), said adjusting step adjusts both a gain value and a bias voltage of said automatic-gain-control stage.

5. A method for controlling a video decoder circuit, comprising the steps of:
   (a.) receiving a first video signal at an input to an analog front-end circuit;
   (b.) converting said first signal into a second signal using adjustment of gain and bias voltage values;
   (c.) in a first mode, inputting said second signal to a conversion circuit;
   (d.) reading the output of said conversion circuit to determine gain and/or bias values; and
   (e.) in a second mode, filtering said second signal with said at least one filter stage not used in said first mode, prior to input to said conversion circuit.

6. The method of claim 5, wherein said filtering is performed by a filter circuit comprising a continuous time filter and a switched capacitor filter.

7. The method of claim 5, wherein said analog front-end circuit comprises an automatic gain control circuit which interfaces to a gain interface circuit to receive said gain value.

8. The method of claim 5, wherein said analog front-end circuit comprises an automatic gain control circuit which interfaces to a bias circuit to receive said bias voltage values.

9. The method of claim 5, wherein said analog front-end circuit comprises an automatic gain control circuit with a differential output.

10. The method of claim 5, wherein said analog front-end circuit comprises an automatic gain control circuit with a single-ended output.

11. The method of claim 5, wherein said filter stage comprises continuous-time and switched-capacitor filters, and a decimator circuit.

12. The method of claim 5, wherein said first mode is performed after a loss of lock to a horizontal sync pulse.

13. The method of claim 5, wherein, during said first mode, samples from an output of said conversion circuit are fed back to a microprocessor-based control circuit to adjust said gain and bias voltage values.

14. The method of claim 5, wherein said analog front-end circuit comprises a clamping circuit which clamps the sync tip level of said first video signal to a reference voltage.

15. The method of claim 5, wherein said first video signal is a composite video signal.

16. The method of claim 5, wherein, during said first mode, samples from the sync tip and back porch levels of said first video signal are obtained from an output of said conversion circuit and fed back to a microprocessor-based control circuit to adjust said gain and bias voltage levels, and an offset level.

17. A video decoder circuit, comprising:
   an input for receiving a video signal, said input being capacitively coupled to an analog front-end circuit; and
   a microprocessor-based control circuit connected to said analog front-end circuit, and comprising;
   a bias circuit for providing a bias voltage;
   a gain interface circuit for changing the amplitude of said input video signal prior to filtering in a filter circuit;
   an offset circuit for changing the DC-level shift of said input video signal; and
   a switching circuit for switching into a calibration mode, by bypassing said filter circuit and connecting said gain interface circuit directly to an analog-to-digital conversion circuit of said analog front-end circuit.

18. The circuit of claim 17, wherein said filter circuit comprises a continuous-time filter and a switched-capacitor filter.

19. The circuit of claim 17, wherein said analog front-end circuit comprises an automatic gain control circuit which operatively connects to said gain interface circuit.

20. The circuit of claim 17, wherein said bias circuit operatively connects to an input of an automatic gain control circuit of said analog front-end circuit.

21. The circuit of claim 17, wherein said analog front-end circuit comprises an automatic gain control circuit with a single-ended output.

22. The circuit of claim 17, wherein said filter circuit comprises continuous-time and switched-capacitor filters, and a decimator circuit.

23. The circuit of claim 17, wherein said calibration mode is performed after a loss of lock to a horizontal sync pulse.

24. The circuit of claim 17, wherein, during said calibration mode, the output of said analog-to-digital conversion circuit is fed back to said microprocessor-based control circuit to adjust said amplitude and DC-level shift.

25. The circuit of claim 17, wherein said analog front-end circuit comprises a clamping circuit which clamps the sync tip level of said video signal to a reference voltage.

26. The circuit of claim 17, wherein said video signal is a composite video signal.

27. The circuit of claim 17, wherein, during said calibration mode, samples from the sync tip and back porch levels of said video signal are obtained from an output of said analog-to-digital conversion circuit and fed back to said microprocessor-based control circuit to adjust said amplitude and DC-level shift.

28. The circuit of claim 17, wherein said gain interface circuit has a differential output.

* * * * *